(12) United States Patent
Byrne et al.

(10) Patent No.: US 8,851,483 B2
(45) Date of Patent: Oct. 7, 2014

(54) ADJUSTABLE CARTRIDGE ASSEMBLY FOR A WORKPIECE-HOLDING MASTER JAW DEVICE

(75) Inventors: Guy E. Byrne, Plainville, CT (US); John S. Darling, Southington, CT (US)

(73) Assignee: Royal Machine and Tool Corporation, Berlin, CT (US)

( * ) Notice: Subject to any disclaimer, the term of this patent is extended or adjusted under 35 U.S.C. 154(b) by 756 days.

(21) Appl. No.: 12/635,886

(22) Filed: Dec. 11, 2009

(65) Prior Publication Data

US 2010/0156053 A1    Jun. 24, 2010

Related U.S. Application Data

(60) Provisional application No. 61/139,719, filed on Dec. 22, 2008.

(51) Int. Cl.
*B23B 31/16* (2006.01)
*B23B 31/177* (2006.01)

(52) U.S. Cl.
CPC ......... *B23B 31/1625* (2013.01); *B23B 2231/30* (2013.01)
USPC ............................ 279/123; 279/110; 279/112

(58) Field of Classification Search
USPC .................. 279/123, 110, 112, 113, 124, 117
IPC ....................................................... B23B 31/16
See application file for complete search history.

(56) References Cited

U.S. PATENT DOCUMENTS

| | | | |
|---|---|---|---|
| 346,133 A * | 7/1886 | Singer ............................ | 279/123 |
| 435,405 A * | 9/1890 | Cushman ....................... | 279/123 |
| 1,033,547 A * | 7/1912 | Cornil ............................ | 279/113 |
| 2,151,455 A * | 3/1939 | Whiton .......................... | 279/111 |
| 2,687,308 A * | 8/1954 | Highberg et al. ............. | 279/123 |
| 2,950,117 A * | 8/1960 | Walmsley ...................... | 279/123 |
| 3,096,098 A * | 7/1963 | Buck ............................. | 279/123 |
| 4,192,521 A * | 3/1980 | Smith ............................ | 279/112 |
| 4,429,887 A * | 2/1984 | Smith ............................ | 279/112 |
| 4,569,530 A * | 2/1986 | Cross ............................. | 279/123 |
| 4,644,636 A * | 2/1987 | Link et al. ..................... | 483/20 |
| 4,725,065 A * | 2/1988 | Hiestand ....................... | 279/123 |
| 4,773,291 A * | 9/1988 | Samson ......................... | 82/132 |
| 4,946,176 A * | 8/1990 | Hillenburg .................... | 279/111 |
| 4,960,285 A * | 10/1990 | Doi ................................. | 279/123 |
| 4,968,194 A * | 11/1990 | Considine ................. | 408/241 R |
| 5,184,833 A * | 2/1993 | Cross et al. .................. | 279/106 |
| 5,199,725 A * | 4/1993 | Jaggers ......................... | 279/123 |
| 5,322,305 A * | 6/1994 | Cross et al. .................. | 279/124 |
| 5,464,232 A * | 11/1995 | Chizmadia .................... | 279/124 |
| 5,542,686 A * | 8/1996 | Revuelta ....................... | 279/153 |

(Continued)

*Primary Examiner* — Eric A Gates
*Assistant Examiner* — Bayan Salone
(74) *Attorney, Agent, or Firm* — McCormick, Paulding & Huber, LLP (57) ABSTRACT

An adjustable workpiece-holding chuck including a chuck body with at least one jaw recess formed therein, which receive an operating jaw. A master jaw may be connected to the operating jaw via an adjustable cartridge assembly that includes a cartridge insert mounted to a recess formed in the master jaw. The cartridge insert includes a cartridge opening formed therein for receiving an adjustable screw. The adjustable screw is mounted to a yoke formed in the operating jaw, thereby releasably connecting the master jaw to the master jaw.
The cartridge opening and the adjustable screw preferably have corresponding threads that form a full-diameter circumferential connection with each other. More preferably, the cartridge opening and the adjustable screw have complementary Acme threads.

9 Claims, 4 Drawing Sheets

(56) References Cited

U.S. PATENT DOCUMENTS

| | | | | |
|---|---|---|---|---|
| 5,845,912 A * | 12/1998 | Grupa | | 279/124 |
| 6,123,375 A * | 9/2000 | Fussey et al. | | 294/207 |
| 6,260,857 B1 * | 7/2001 | Wienhold et al. | | 279/62 |
| 6,478,311 B1 * | 11/2002 | Hinson | | 279/123 |
| 6,662,689 B1 * | 12/2003 | Voskanyan | | 81/163 |
| 7,052,334 B1 * | 5/2006 | Cabay et al. | | 439/803 |
| 7,128,724 B2 * | 10/2006 | Marsh | | 602/18 |
| 8,272,646 B2 * | 9/2012 | Fink | | 279/124 |
| 2001/0048204 A1 * | 12/2001 | Sida | | 279/124 |
| 2004/0204666 A1 * | 10/2004 | Marsh | | 602/18 |

* cited by examiner

ADJUSTABLE CARTRIDGE ASSEMBLY FOR A WORKPIECE-HOLDING MASTER JAW DEVICE

PRIORITY CLAIM TO RELATED APPLICATIONS

This application claims the benefit of the U.S. Provisional patent application No. 61/139,719 filed on Dec. 22, 2008, the entirety of which is hereby incorporated by reference.

FIELD OF THE INVENTION

The present invention generally relates to a chuck for a machine tool and, more particularly, to a workpiece-holding chuck having an adjustable cartridge assembly.

BACKGROUND OF THE INVENTION

The use of chucks to hold workpieces on machine tools, such as lathes, milling machines, turning machines and the like, is almost as old as machine tools themselves. Early lathes, for example, were used to turn a workpiece while applying a tool, such as a blade, to craft the workpiece into a desirable form. Chucks were employed early on to hold the workpiece in place to keep the workpiece from slipping during a machining operation. If the workpiece moved in any way while being turned on the machine, the workpiece could easily be damaged, requiring the operator to start a part over again using a new workpiece. If the workpiece slipped or, even worse, came loose from the chuck, the workpiece could also pose a threat to the operator. Accordingly, it has long been desirable to use chucks that hold the workpiece securely and safely in the machine tool during operation of the machine.

A key issue with chucks, however, is adjustability. Chucks may need to hold workpieces of varying shape and size. Most early lathes were used to turn and craft round parts, such as furniture legs and spindles. Such round parts were easy to hold securely on the machine. Additionally, little adjustment of the chucks was needed when holding standard round parts. Typically, a chuck with independently adjustable master jaws was provided to hold the workpiece. Such a chuck design was acceptable so long as production levels were low and manageable for the operator. With low production levels, the operator could make sure the workpiece is properly centered and adequately secured before starting the machine.

As time went on, mass production of parts became more desirable and, thus, operators were required to increase the speed with which parts were manufactured. As a result, operators needed to change over from a completed part to a new workpiece quickly. The use of independently adjustable jaws was not desirable for mass production because too much time was needed to adjust each jaw to center a new workpiece. Accordingly, independently adjustable master jaws were replaced with chucks using self-centering jaws. Positioning and gripping the workpiece was quicker and easier with self-centering jaws because the operator no longer needed to adjust each jaw separately to center the workpiece and could quickly get the machine operating with less downtime required for set-up.

Eventually, machine tools began to be used to manufacture oddly shaped parts, such as sand castings. Safe and efficient operation of the machine tool required that all parts, regardless of shape, be held securely and safely during operation of the machine. The ease with which the jaws of the chuck could hold round parts did not carry over to such oddly shaped parts. Accordingly, new jaw designs were needed to ensure that any workpiece, regardless of shape and size, could be held in place during machine operation without affecting production or safety. That is, different part designs, depending on shape and size, may require specifically designed chuck jaws in order to be held securely and safely during operation. Commonly, variations in workpiece shape and size require a separate, customized set of chuck jaws. Accordingly, use of a single machine would be inefficient and less time effective if the chuck jaws needed to be constantly changed from part to part. Each change over would result in downtime while one set of chuck jaws were removed and replaced by another set of chuck jaws, depending on the part being crafted. Moreover, the requirement to use different chuck jaws for different shaped or sized parts could be expensive. A more efficient, less costly, and more versatile design is desired that can accommodate workpieces of various designs, shapes and sizes.

Removing and replacing chuck master jaws is also a legitimate concern for the machine operator. Every time a chuck master jaw is removed, use of the machine is affected because downtime eats into manufacturing time. Chuck master jaws may need to be removed regardless of whether the size and shape of the workpiece changes. For example, chuck master jaws often need to be removed for repair or replacement. The downtime for repair or replacement often depends on the damage to the chuck. There is a desire to have a chuck design that facilitates repair and, where needed, replacement, without greatly affecting operation and efficiency of the machine tool, in general.

A solution to this problem of needing multiple sets of chuck jaws or alternatively, multiple machines, to be able to produce various parts was the development of the two-piece adjustable master jaw. This design provided greater flexibility for the machine to accommodate workpieces of varying shape and size without the need to slow down operation time by needing to change the chuck. Although various methods of adjusting the master jaw have been tried, the most common design in use today is a two-piece master jaw with a lower operating jaw and an upper adjustable jaw. An adjustable screw is trapped in the lower operating jaw and a half-diameter thread is cut in the upper jaw. The upper jaw sits atop the lower operating jaw and may be adjusted using the interaction between the adjustable screw and the upper jaw to actuate the upper jaw to a desired position. Commonly, a machine tool comprises multiple upper master jaws, all of which can be adjusted to center and hold a workpiece securely for machining.

Due to forces being applied on the upper master jaw in such a set-up, the thread on the adjustable screw must be the square cut style of thread. This style of thread is difficult to machine on an adjustable screw and very difficult to machine in the upper master jaw in order to accommodate the adjustable screw, as only a half-diameter of a thread is typically machined into the upper master jaw. Most other types of threads, for example, those manufactured with sloped sides, often can not handle the forces exerted through use of the chuck. That is, when pressure is applied on the upper master jaw in intended operation, the adjustable screw is susceptible to binding in the lower operating jaw. Square cut style thread is less economical, forms weaker contact and is harder to repair or replace than some other thread designs.

The two-piece adjustable master jaw design of the prior art solves the problem of gripping workpieces with large variations but has its own set of problems. As already stated, manufacturing of the adjustable screw and upper master jaw is difficult and expensive. Also, after the chuck has been in use for a period of time, it can become damaged or worn and, thus, need to be repaired. Repair of the chuck requires that the chuck be taken out of production and rebuilt. The rebuilding process almost always requires manufacturing a new adjustable screw and replacing the upper master jaw with a new one. This becomes very expensive and time consuming. In particular, the wear caused by moving the adjustable screw relative to the upper master jaw often decreases the integrity of the connection between the upper master jaw and the chuck before significant wear occurs to other portions of the upper master jaw. However, because the upper master jaw, as known in the prior art, is of unitary construction, the entire upper master jaw needs to be repaired.

In view of the foregoing, there is a need for a chuck design that can accommodate variously shaped and sized workpieces and be adjusted without affecting operational efficiency of the machine. The present invention was developed to eliminate the problems of existing chuck designs by providing an adjustable cartridge assembly for connecting the lower operating jaw to the upper master jaw while holding a workpiece securely and safely in a machine tool.

SUMMARY OF THE INVENTION

In accordance with one embodiment of the present invention, an adjustable cartridge assembly is provided for adjustably attaching a master jaw to an operating jaw of a workpiece-holding chuck. The operating jaw has a jaw recess facing the master jaw and at least one bearing brace mounted adjacent to the jaw recess. The cartridge assembly includes the combination of a cartridge insert having a full-diameter cartridge opening and being configured for mounting to the master jaw, and an adjustable screw rotatably mounted in the cartridge opening and being configured for rotatably mounting to the at least one bearing brace.

In accordance with a second embodiment of the present invention, an adjustable workpiece-holding chuck is provided that includes an adjustable cartridge assembly. In particular, the adjustable workpiece holding chuck includes a cylindrical chuck body having at least one jaw recess in a frontward facing surface, at least one operating jaw mounted to one of the at least one jaw recess and having at least one bearing brace that opens toward the frontward facing surface, at least one adjustable cartridge assembly mounted to the at least one bearing brace, wherein the at least one adjustable cartridge assembly includes, an adjustable screw that is releasably, rotatably mounted to the at least one bearing brace, and a cartridge insert having a cartridge opening mounted to the adjustable screw, and at least one jaw mounted to the cartridge insert of the at least one adjustable cartridge assembly.

In accordance with a third embodiment of the present invention, a method for attaching a master jaw to a master jaw of a chuck is provided. The method includes the steps of mounting an adjustable cartridge assembly to an upper recess in the upper master jaw, wherein the adjustable cartridge assembly includes a cartridge insert having a threaded cartridge opening, and an adjustable screw rotatably mounted in the cartridge opening; and attaching the adjustable screw to a bearing brace positioned on the master jaw.

It is an object of the present invention to provide an adjustable cartridge assembly for a workpiece-holding chuck.

It is an object of the present invention to provide an adjustable cartridge assembly that facilitates manufacturing and assembly of the workpiece-holding chuck.

It is an object of the present invention to provide an adjustable cartridge assembly that reduces maintenance frequency.

It is an object of the present invention to provide an adjustable cartridge assembly that facilitates removal, repair and replacement.

It is an object of the present invention to provide an adjustable cartridge assembly that is cheap to manufacture and maintain.

It is an object of the present invention to provide an adjustable cartridge assembly that includes an adjustable screw mounted to the upper master jaw that is releaseably mounted to the lower operating jaw. In particular, the adjustable cartridge assembly that includes an adjustable screw mounted in a cartridge insert mounted to the upper master jaw and mounted to a bearing brace of a yoke formed in the lower master jaw.

It is an object of the present invention to provide an adjustable cartridge assembly that uses an Acme thread adjustable screw and corresponding full-diameter cartridge opening in the cartridge insert.

These and other features of the present invention are described with reference to the drawings of preferred embodiments of an adjustable cartridge assembly for use with a workpiece-holding adjustable chuck. The illustrated embodiments of the adjustable cartridge assembly of the present invention are intended to illustrate, but not limit, the invention.

DETAILED DESCRIPTION OF THE PREFERRED EMBODIMENTS

Figure 1:
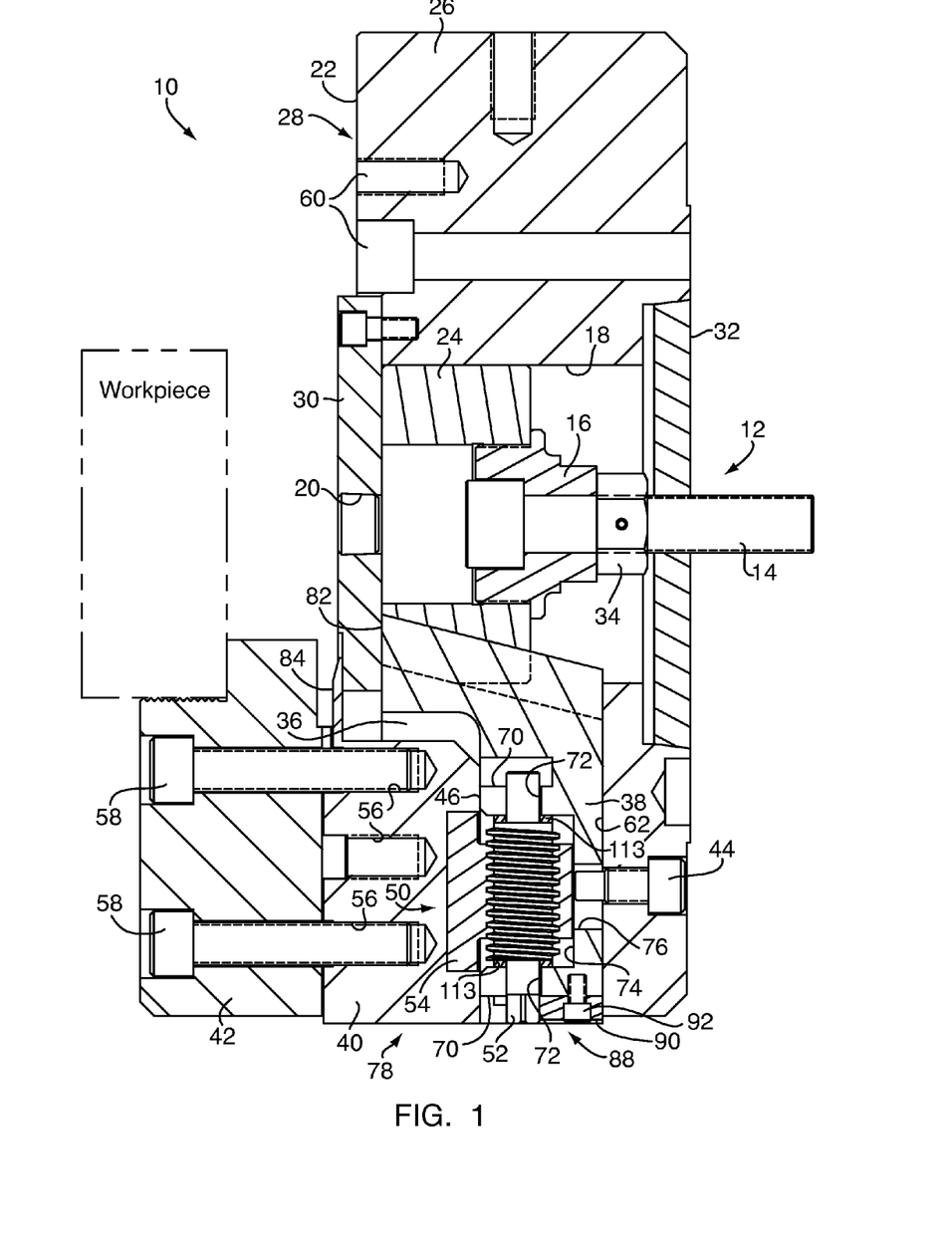
FIG. 1 is a side view of a cross section of an adjustable workpiece-holding chuck showing an adjustable cartridge assembly connected to an axle assembly in accordance with an embodiment of the present invention.

Referring to FIG. 1, an adjustable workpiece-holding chuck in accordance with the present invention is generally shown at 10 and attached to an axle assembly 12. The axle assembly 12 includes an axle 14, one end of which is connected to a rotational drive source, such as a motoring unit of the machining tool, or a supporting device (not shown). The opposing end of the axle 14 is connected to an axle head 16 having engagement means for engaging with an axle bore 18 in the axial center of the adjustable chuck 10. The axle bore 18 connects to a central bore 20, which extends to a frontward facing surface 22 of the adjustable chuck 10.

Concentrically formed about the axle bore 18 are an inner ring 24 and an outer ring 26, which define a cylindrical chuck body 28. The inner ring 24 is mounted circumferentially around the axle head 16. The outer ring 26 is mounted circumferentially around the inner ring 24 and extends axially frontward and backward to connect to front and rear hub caps 30, 32, respectively. For instance, the front hub cap 30 is connected to the outer ring 26 on its frontward facing surface. Each hub cap 30, 32 covers a longitudinal end of the axle bore 18, excluding an opening formed in the axial center of the hub cap 30, 32. The front hub cap 30, positioned on the workpiece-side of the outer ring 26, is a substantially flat circular member that is axially aligned with the axle 14 and extends forward to connect to an axial wall of a front recess in the frontward facing surface of the outer ring 26. The front hub cap 30 is held in place using a fastener inserted through a bore in the front hub cap 30 and into the outer ring 26. The rear hub cap 32, positioned on the axle-side of the adjustable chuck 10, is a substantially flat circular member that is axially mounted about the axle 14 and circumferentially engages a radial wall of a rear recess in the rearward facing surface of the outer ring 26. A bushing 34 is axially fitted to the axle 14 between the rear hub cap 32 and the axle head 16 for maintaining spacing.

The outer ring 26 includes a jaw recess 36 formed in its frontward facing side. The jaw recess 36 acts as an anchor for mounting a lower operating jaw 38, an upper master jaw 40 and a top gripping jaw 42 to the outer ring 26. Specifically, the lower operating jaw 38 is inserted from the radially outward side of the outer ring 26 into the rearward portion of the jaw recess 36. When assembled, the lower operating jaw 38 engages a knob 44 that protrudes through a rearward bore in the outer ring 26. The knob 44, among other structural elements, retains the lower operating jaw 38 in the jaw recess 36. The frontward facing surface of the lower operating jaw 38 has a yoke 46 formed therein, adjacent to the jaw recess 36.

The upper master jaw 40, which is inserted into the frontward portion of the jaw recess 36, is attached to the yoke 46 via an adjustable cartridge assembly 50. The relative position of the upper master jaw 40 with respect to the lower operating jaw 38 can be adjusted by actuating an adjustable screw 52 mounted in a cartridge insert 54, both of which are included in the adjustable cartridge assembly 50. The frontward facing surface of the upper master jaw 40 has a plurality of sockets 56 along the length of the upper master jaw 40 for mounting the top gripping jaw 42.

In particular, as shown in FIG. 1, the top gripping jaw 42 is connected to the upper master jaw 40 via top fasteners 58 inserted through bores in the top gripping jaw 42 and that extend into the sockets 56. The connection between the top gripping jaw 42 and the upper master jaw 40 is incrementally adjustable such that the top gripping jaw 42 can be secured to any of the sockets 56. The top gripping jaw 42 provides a working surface for engaging the workpiece and, thus, can be formed in a range of shapes and sizes to satisfy a broad range of design requirements.

Figure 2:
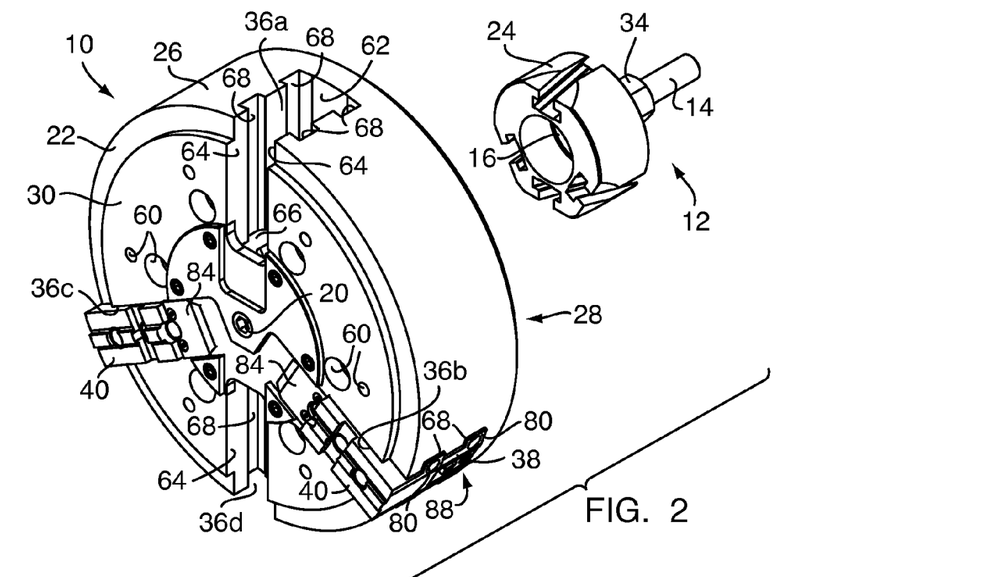
FIG. 2 is a perspective view of an adjustable workpiece-holding chuck alongside an axle assembly in accordance with an embodiment of the present invention.

Referring to FIG. 2, the adjustable chuck 10 is shown in perspective exploded view with the axle assembly 12. As shown in FIG. 2, the inner ring 24 is mounted to the axle head 16 via engagement means and includes a series of T-shaped grooves that align with a series of radially disposed jaw recesses 36a, 36b, 36c, 36d in the outer ring 26.

In a preferred design, three of the jaw recesses 36a, 36b, 36c are uniformly disposed from each other at an angle of 120°. Another jaw recess 36d is disposed at an opposing position from one of said three jaw recesses, for instance, at an angle of 180° with respect to one of the jaw recesses 36a, and at an angle of 60° with respect to the other two jaw recesses 36b, 36c. Each jaw recess 36 has a substantially rectangularly-shaped cross-section.

Two concentric hexagonal formations of anchoring bores 60 are disposed in the frontward facing surface of the outer ring 26. The anchoring bores 60 are centered about the central bore 20 such that each formation of anchoring bores 60 is disposed at substantially the midpoint of a radius of the frontward facing surface of the outer ring 26 and radially outward from the midpoint, respectively. The anchoring bores 60 reduce the weight of the outer ring 26 while adding utility and versatility to the outer ring 26. For example, weights can be attached to the anchoring bores 60 to counter-balance the workpiece held by or otherwise attached to the adjustable chuck 10.

Figure 3:
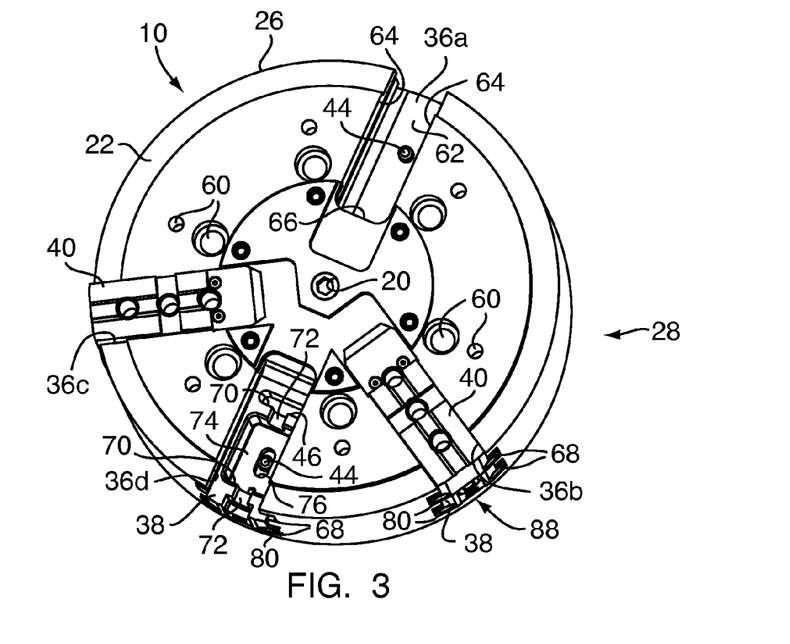
FIG. 3 is a more frontward perspective view of the adjustable workpiece-holding chuck of FIG. 2.

Regarding FIG. 3, for illustrative purposes, the jaw recesses 36a, 36b, 36c, 36d of the adjustable chuck 10 are shown in three stages of jaw assembly installation. A first jaw recess 36a is unobstructed or vacant. The first jaw recess 36a is characterized by a frontward facing wall 62 having a knob 44 protruding therefrom, two sidewalls 64 and an inner wall 66. The two sidewalls 64 are substantially perpendicular to the frontward facing wall 62 and connect the frontward facing wall 62 to the frontward facing surface of the outer ring 26. Each sidewall 64 includes a pair of lateral grooves 68. The inner wall 66 abuts the frontward facing wall 62 on the radially inward end and slopes forward to connect the frontward facing wall 62 to the frontward facing surface of the outer ring 26.

A fourth jaw recess 36d has a lower operating jaw 38 inserted therein. The lower operating jaw 38 has a yoke 46 formed therein on its frontward facing surface. The yoke 46 includes a pair of bearing braces 70 that each define a U-shaped opening 72 that is directed toward or opens away from the frontward facing wall 62 (i.e., toward the frontward facing surface of the outer ring 26) and is aligned with one another and radially relative to the central bore 20. A substantially rectangular yoke recess 74 is disposed between the bearing braces 70. In the frontward facing surface of the yoke recess 74, the knob 44 extends through the lower opening 76 in the rearward wall of the yoke recess 74 to adjustably secure the lower operating jaw 38 to the outer ring 26 in a range of positions.

A second jaw recess 36b, like the third jaw recess 36c, is shown having a lower operating jaw 38 inserted into the jaw recess 36b, as discussed above, and an upper master jaw 40 attached to the lower operating jaw 38. The upper master jaw 40 adjustably attaches to the lower operating jaw 38 using an adjustable cartridge assembly 50, as described in more detail below.

Figure 4:
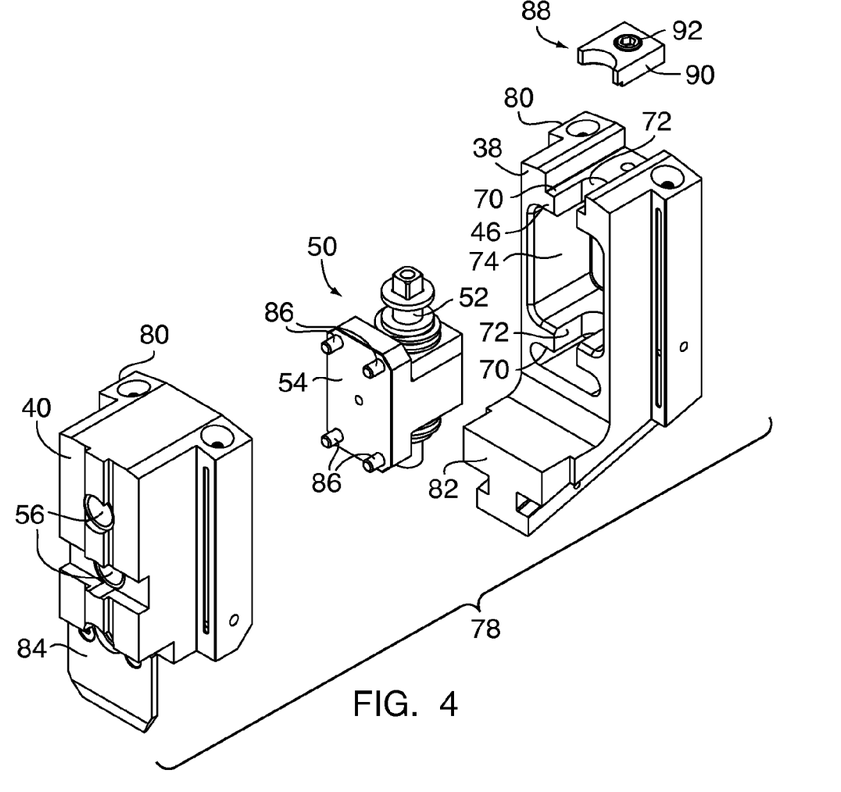
FIG. 4 is an exploded perspective view of a jaw assembly in accordance with an embodiment of the present invention.

Regarding FIG. 4, a preferable jaw assembly design is generally shown at 78. Each jaw assembly 78 has a lower operating jaw 38 and an upper master jaw 40 connected via an adjustable cartridge assembly 50. The lower operating jaw 38 and the upper master jaw 40 are fitted to be received in the rearmost and foremost portions of a jaw recess, respectively. For instance, both the lower operating jaw 38 and the upper master jaw 40 are substantially rectangular and include a lateral flange 80 for engaging the lateral grooves of a jaw recess in the chuck 10. The lower operating jaw 38 also has a frontward protrusion 82 that is fitted to engage the inner radial wall of a jaw recess, when assembled, and the upper master jaw 40 has a radially protruding tab 84 that is fitted to conform to the frontward facing surface of a front hub cap, when assembled.

The adjustable cartridge assembly 50 includes an adjustable screw 52 and a cartridge insert 54. One side of the adjustable cartridge assembly 50, namely, the cartridge insert 54, is fitted to be fixedly attached to the upper master jaw 40, for example, by cartridge fasteners 86, such as screws or the like. The opposing side of the adjustable cartridge assembly 50, namely, the adjustable screw 52, is fitted to be received by the yoke recess 74 formed in the lower operating jaw 38 such that, when assembled, the adjustable screw 52 is releaseably connected to the bearing braces 70 of the yoke 46.

A lock clamp 88 is attached to the radially outward end of the lower operating jaw 38 proximate the position of the adjustable screw 52 of the adjustable cartridge assembly 50, when installed. For example, the lock clamp can take the form of a clamp 90 having a clamp ring 92 for attaching the clamp 90 to the lower operating jaw 38.

In an alternative embodiment of the present invention, the cartridge insert can be mounted in the lower operating jaw and the adjustable screw can be trapped in the upper master jaw. In such an embodiment, a corresponding juxtaposition of the upper recess to the lower operating jaw and the yoke and lower recess to the upper master jaw is provided.

Figure 5:
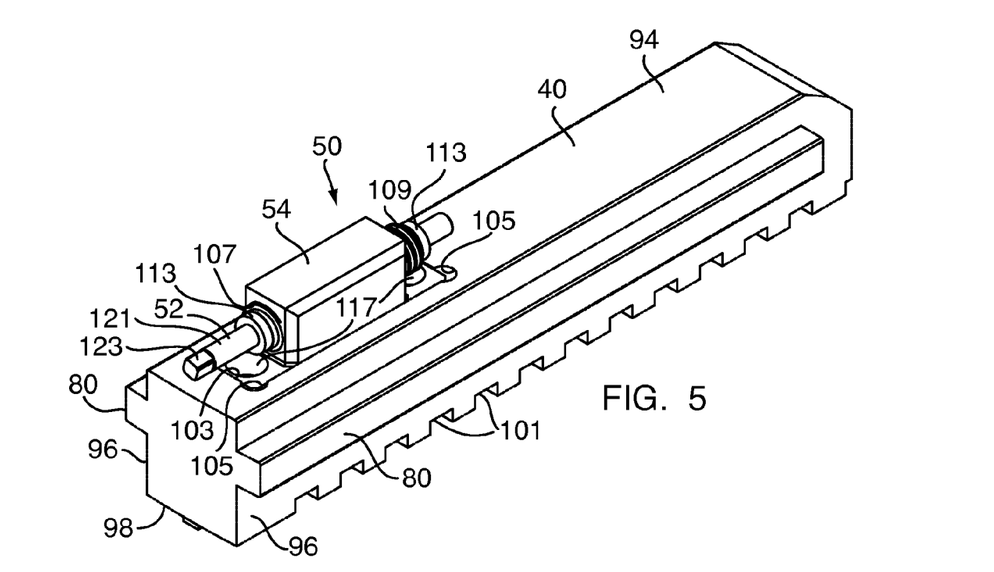
FIG. 5 is a perspective view of an adjustable cartridge assembly mounted to a master jaw in accordance with an embodiment of the present invention.

Regarding FIG. 5, an adjustable cartridge assembly 50 attached to an upper master jaw 40 is shown.

The upper master jaw 40 has a substantially rectangular body including a lower surface 94, side surfaces 96 having laterally projecting flanges 80, and a bottom surface 98 having contours 101. The lower surface 94, which is directed towards the lower operating jaw of the chuck, as shown in FIG. 1, when mounted in position, is substantially flat except for a recess 103 that is bored or formed therein to receive the cartridge insert 54 of the adjustable cartridge assembly 50. The corners of the recess 103 include carveouts 105 to facilitate access to the cartridge insert 54 and promote insertion and removal of the cartridge insert 54 into and out of the recess 103. The contours 101, in conjunction with the sockets 56, provide an engageable surface for connecting a top gripping jaw to the upper master jaw 40 in a range of incremental positions.

Figure 6:
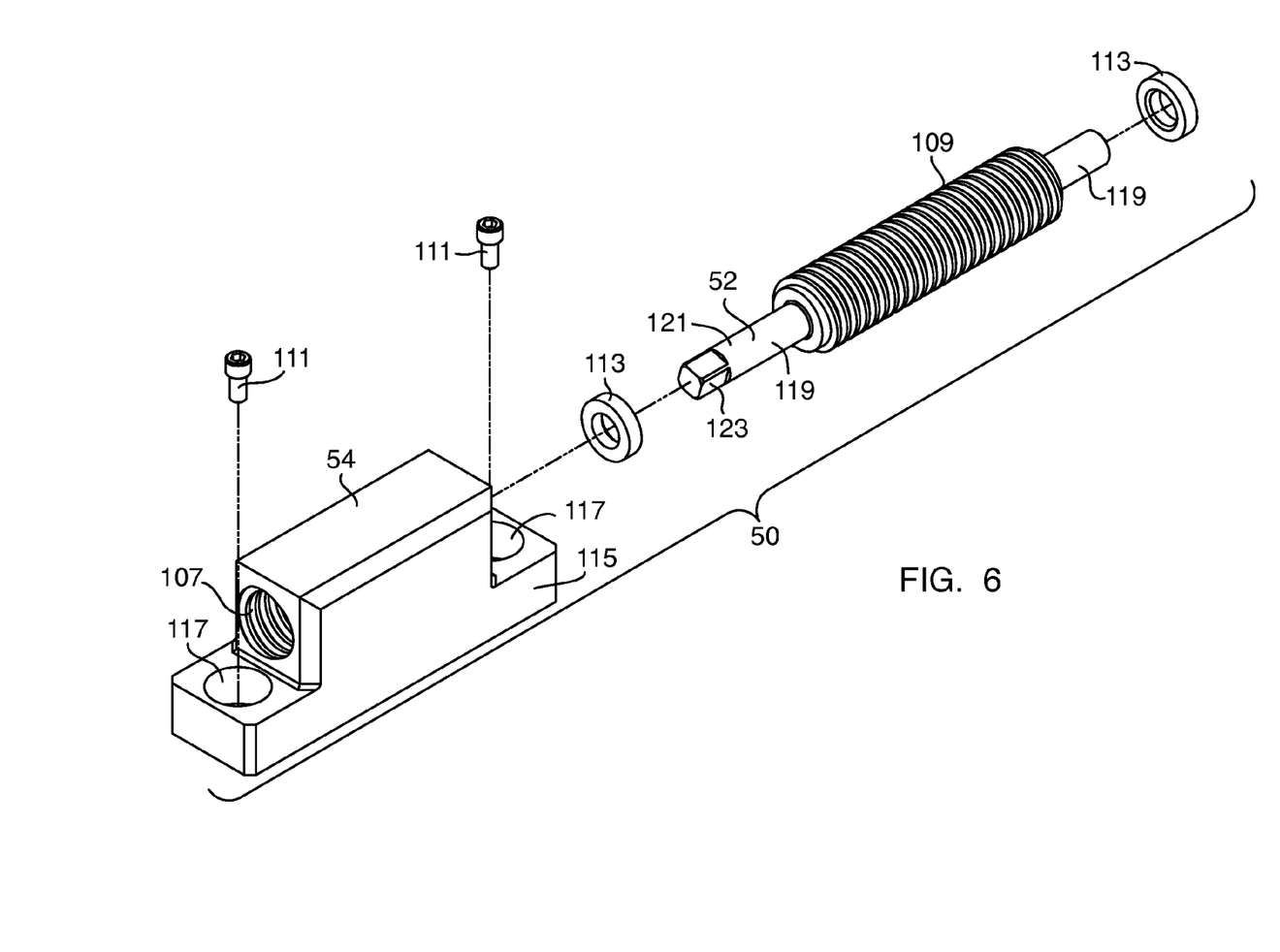
FIG. 6 is an exploded perspective view of an adjustable cartridge assembly in accordance with an embodiment of the present invention.

Referring also to FIG. 6, an adjustable cartridge assembly 50 with two fasteners 111 and two washers 113 is shown. The cartridge insert 54, as most clearly shown in FIG. 6, includes a flanged base 115 having cartridge bores 117 for mounting or otherwise attaching the cartridge insert 54 to the upper master jaw. The cartridge insert 54 is attached to the upper master jaw using fasteners 111 inserted through the cartridge bores 117 and into the upper master jaw.

As shown, the cartridge insert 54 is a substantially T-shaped member that protrudes from the lower surface 94 of the upper master jaw 40 when installed in the recess 103 thereof. The cartridge insert 54 has a cartridge opening 107 formed therein for receiving and engaging the threaded portion 109 of the adjustable screw 52. The full-diameter, circumscribing contact formed between the cartridge opening 107 and the threaded portion 109, among other things, increases the strength and stability of the connection between the cartridge opening 107, which, in turn, enables the use of any type of thread. For example, as shown in FIGS. 5 & 6, the cartridge opening 107 and threaded portion 109 use complimentary Acme threads.

In addition, the full-diameter, circumscribing contact formed between the cartridge opening 107 and the threaded portion 109 reduces wear and tear to both elements as well as the upper master jaw 40. In one embodiment, the cartridge opening 107 is positioned a sufficient distance from the lower surface 94 of the upper master jaw 40 such that there is no thread cut in the upper master jaw 40, which prevents wear and tear to the lower surface 94.

The edges of the cartridge insert 54 are tapered to facilitate insertion and removal into and out of the lower recess 103. In other words, the cartridge insert 54 is readily replaceable. This is especially useful if the cartridge assembly 50 needs to be repaired. A replaceable assembly can simply be exchanged for the damaged assembly and the machine can be used with little, if any, downtime.

The adjustable screw 52 is rotatably mounted in the cartridge opening 107 such that the full-diameter circumference of a threaded portion 109 is fitted to the threads of the cartridge opening 107. The threaded portion 109 extends along the middle of the adjustable screw 52 between tapered portions 119 or, by another measure, for a distance slightly shorter than the distance between the bearing braces of the lower operating jaw.

A longitudinal end 121 of the adjustable screw 52 extends beyond the radially outward bearing brace of the lower operating jaw 38 when the threaded portion 109 is disposed between the bearing braces so that the longitudinal end 121 is accessible from the radial outer side of a lower operating jaw 38 when the adjustable chuck 10 is assembled. The longitudinal end 121 has a head portion 123 that is characterized by an engageable geometry. For example, the head portion 123 is square shaped so that the adjustable screw 52 can be rotated by a wrench applied to the head portion 123. The head portion 123 is also engageable by a lock clamp, for instance, when the adjustable screw 52 is not being actuated by the user, to retain the adjustable screw 52 in a fixed position.

Washers 113 are mounted to the tapered portions 119 along each side of the threaded portion 109 and abut opposing ends of the cartridge opening 107. When the jaw assembly is assembled, each washer 113 separates the adjustable screw 52 from the adjacent bearing brace to reduce wear and tear therebetween. For example, a first radial face of each washer 113 engages the threaded portion and a second radial face of each washer 113 engages the bearing braces.

It should be further appreciated that, if actuation of the upper master jaw relative to the lower operating jaw is desired, the user need only apply a wrench to the head portion to rotate the adjustable screw and, thereby, affect a radial displacement of the upper master jaw with respect to the lower operating jaw and the remainder of the adjustable chuck.

It should be appreciated that, if it becomes necessary to repair or replace the adjustable screw or the cartridge insert, the adjustable screw and cartridge insert can be replaced independently of the lower operating jaw and the upper master jaw. Such a repair or replacement can be performed by disassembling the connection between the lower operating jaw and the upper master jaw, only. In other words, the lower operating jaw need not be detached from the outer ring and the top gripping jaw need not be detached from the upper master jaw. Instead, the adjustable screw of the adjustable cartridge assembly is released from the bearing braces of the lower operating jaw, the single component in need of repair can be fixed or replaced, and then the adjustable chuck can be reassembled by remounting the adjustable screw to the bearing braces.

It should be understood that the foregoing description is only illustrative of the present invention. Various alternatives and modifications can be devised by those skilled in the art without departing from the broader aspects of the present invention.

In an alternative embodiment of the present invention, the cartridge insert can be made with different material and shape to suit each desired design situation. Also the adjustable screw can be manufactured with a complementary thread to ensure secure interaction between the adjustable screw and the cartridge insert.

In an alternative embodiment of the present invention, the head portion of the adjustable screw is formed in other engageable shapes to be operable with a variety of wrenches, screw drivers and other tools.

In an alternative embodiment of the present invention, the adjustable screw can be made with different material, pitch or angle to suit each desired design situation. As noted above, the adjustable screw complementarily matches the cartridge insert to ensure a secure interaction between the screw and the cartridge insert.

In an alternative embodiment of the present invention, the inner ring has elastic properties and dampens rotational force differentials between the axle and the outer ring.

Additionally, any description of embodiments, components, or options of the present invention has been presented for the purpose of illustration and description; it is not intended to be exhaustive or to limit the invention to the form disclosed. Obvious modifications and variations are possible in light of the above disclosure. Any embodiments specifically described were chosen to best illustrate the principles of the invention and practical applications thereof to enable one of ordinary skill in the art to utilize the invention in various embodiments and with various modifications as suited to the particular use contemplated.

What is claimed is:

1. An adjustable workpiece holding chuck, the chuck comprising:
    a cylindrical chuck body having a jaw recess in a frontward facing surface;
    an operating jaw mounted into the jaw recess; and
    an master jaw mounted into the jaw recess substantially adjacent to the operating jaw;
    wherein one of the operating jaw or the master jaw includes a bearing brace;
    wherein an adjustable cartridge assembly is fixedly attached to the other of operating jaw or the master jaw; and
    wherein said adjustable cartridge assembly comprises:
    an adjustable screw that is releasably, rotatably mounted to the bearing brace; and
    a cartridge insert having a cartridge opening that threadedly receives the adjustable screw, said cartridge insert being the portion of the adjustable cartridge assembly that is fixedly attached to the other of the operating jaw or the master jaw, and said cartridge insert being detachable from the operating jaw and from the master jaw without removing said adjustable screw from said cartridge insert.

2. The workpiece holding chuck according to claim 1, wherein the operating jaw includes the bearing brace and the master jaw includes the adjustable cartridge assembly.

3. The workpiece holding chuck according to claim 2, wherein the bearing brace has a U-shaped opening that opens toward the frontward facing surface.

4. The workpiece holding chuck according to claim 3, wherein the U-shaped opening is radially oriented with respect to the chuck body.

5. The workpiece holding chuck according to claim 2, wherein the adjustable screw comprises:
    a threaded portion fitted to rotatably engage the cartridge opening;
    at least one tapered portion fitted to rotatably engage the bearing brace; and
    a longitudinal end portion shaped to be engaged for rotating the adjustable screw.

6. The workpiece holding chuck according to claim 5, further comprising: an adjustment lock clamp that adjustably engages the longitudinal end portion for obstructing the rotation of the adjustable screw.

7. The workpiece holding chuck according to claim 5, wherein the threaded portion of the adjustable screw is a full-diameter Acme thread design.

8. The workpiece holding chuck as claimed in claim 1, wherein the cartridge insert is releasably slidingly inserted into a yoke recess adjacent the bearing brace, and the master jaw and the operating jaw are releasably slidingly inserted into the jaw recess.

9. A method for adjustably attaching a master jaw of a chuck to an operating jaw of the chuck, the method comprising:
    fixedly attaching to one of the master jaw or the operating jaw, in a single motion, a cartridge insert portion of an adjustable cartridge assembly that includes:
        the cartridge insert; and
        an adjustable screw rotatably mounted through a full-circumference threaded opening of the cartridge insert;
    releasably, rotatably mounting the adjustable screw of the adjustable cartridge assembly into a bearing brace positioned on the other of the master jaw or the operating jaw; and
    releasably slidingly inserting the master jaw, the adjustable cartridge assembly, and the operating jaw into a jaw recess of the chuck.

* * * * *